July 17, 1951 F. J. WEGLARZ 2,561,301
GALLOPING HORSE
Filed Nov. 6, 1948 2 Sheets-Sheet 1
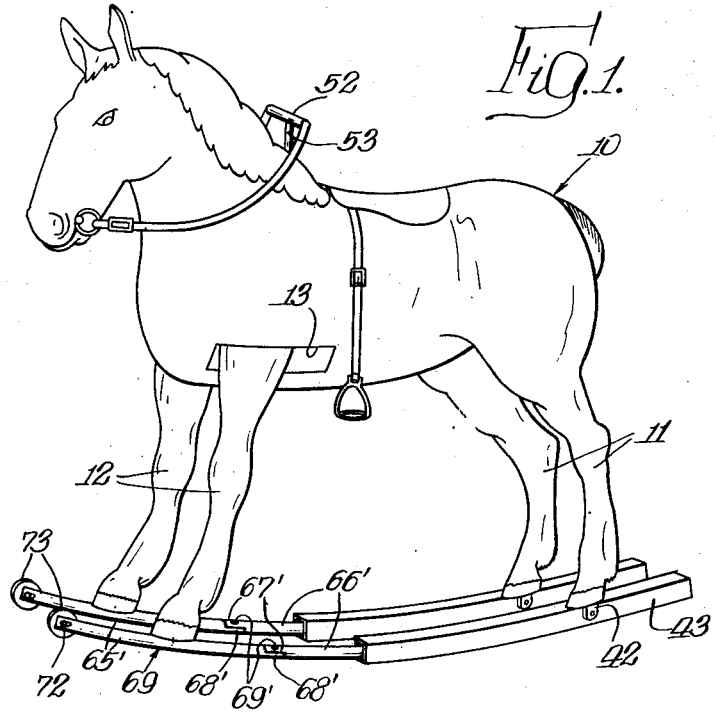
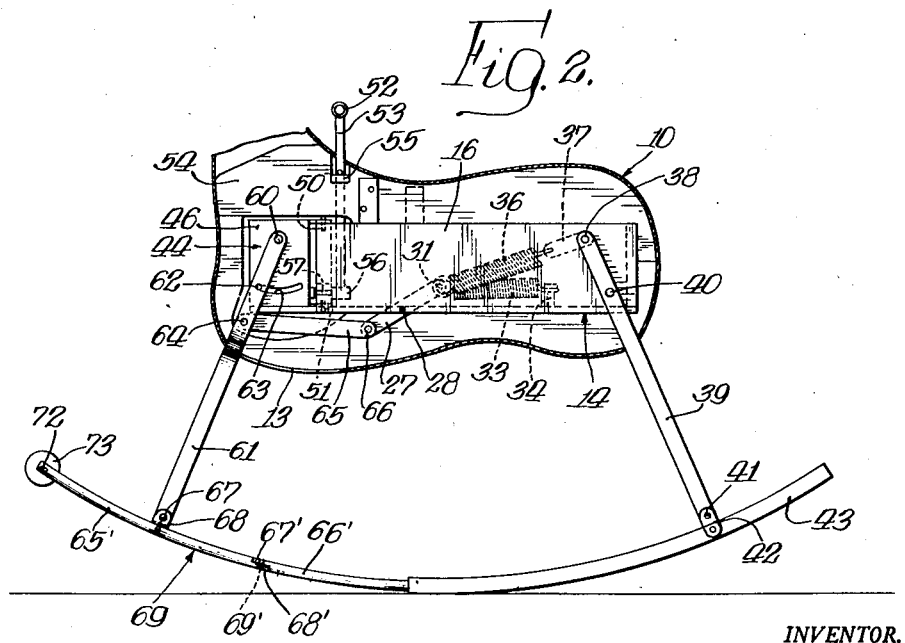
INVENTOR.
Frank J. Weglarz,
BY John P. Smith
Atty.

July 17, 1951 F. J. WEGLARZ 2,561,301
GALLOPING HORSE
Filed Nov. 6, 1948 2 Sheets-Sheet 2
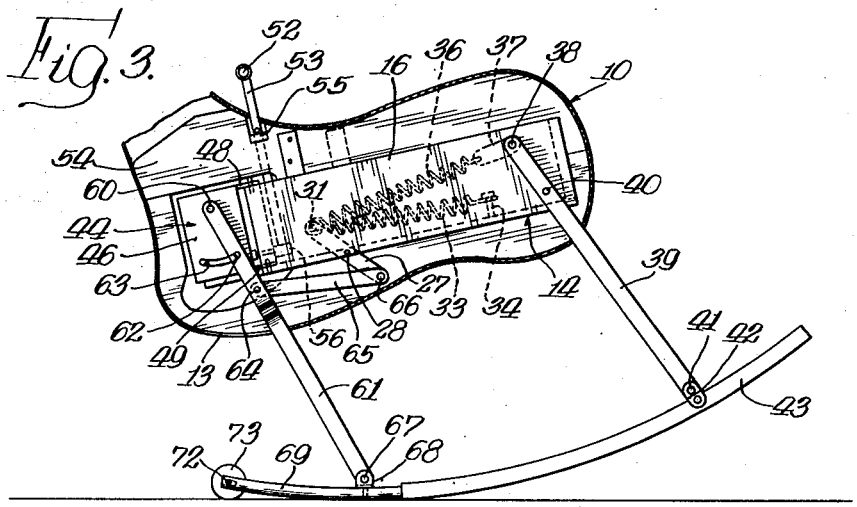
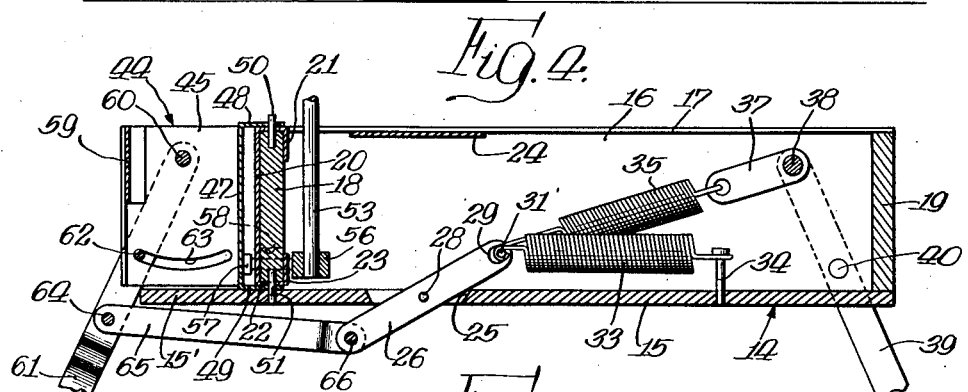
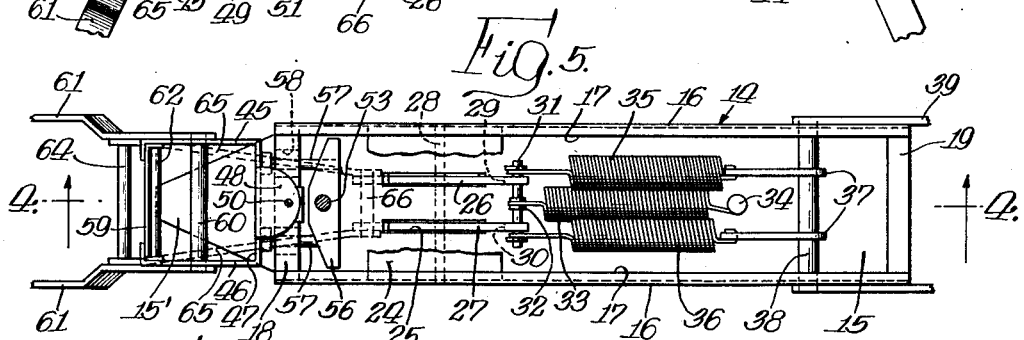
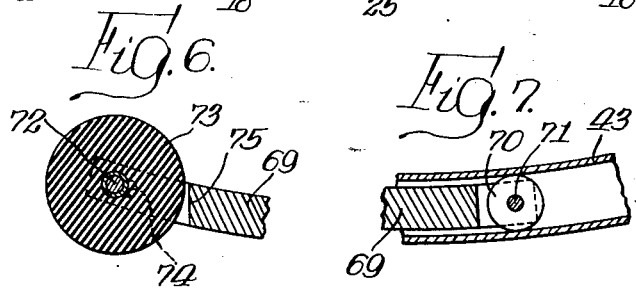
INVENTOR.
Frank J. Weglarz,
BY John P. Smith
Atty.

Patented July 17, 1951

2,561,301

UNITED STATES PATENT OFFICE 2,561,301

GALLOPING HORSE

Frank J. Weglarz, Chicago, Ill.

Application November 6, 1948, Serial No. 58,770

5 Claims. (Cl. 280—1.177)

The present invention relates generally to a novel and improved galloping or walking horse which, upon to and fro movement of the rider, advances the horse forwardly by successive stages.

Another object of the invention is to provide a novel and improved rocking or galloping horse which is not only capable of advancing forwardly on successive stages upon to and fro movement of the rider, but also has means associated therewith and under the control of the rider to cause the horse to turn to the right or left in a gradually curving arc.

Another object of the invention is to provide a novel and improved galloping or rocking horse which is provided with forward rocking sections having rollers journaled on the forward ends thereof which permit the horse to roll forwardly at greater stages or which may also act as a brake to interrupt the rolling action and serve as a stop.

These and other objects are accomplished by providing a construction and an arrangement of the various parts in the manner hereinafter described and particularly pointed out in the appended claims.

Referring to the drawings:

Fig. 1 is a perspective view of my improved rocking or galloping horse;

Fig. 2 is a side elevational view of the same showing a portion of the horse body in cross section;

Fig. 3 is a similar side elevational view as Fig. 2 showing the position of the front legs of the horse when the rider rocks forwardly;

Fig. 4 is an enlarged longitudinal cross sectional view taken on the line 4—4 in Fig. 5;

Fig. 5 is an enlarged fragmentary top plan view of the operating mechanism for actuating the forward movement of the horse;

Fig. 6 is an enlarged fragmentary cross sectional view showing the manner in which the rollers are attached to the front ends of the front rocker sections; and Fig. 7 is an enlarged fragmentary cross sectional view showing the manner in which the front rocker sections are telescopically mounted in the rear rocker sections.

In illustrating one form in which my invention may assume in practice, I have shown the same in connection with a simulated horse, generally indicated by the reference character 10 supported on rigid or stationary rear legs 11. The front legs 12 are adapted to swing backwardly and forwardly about pivots hereinafter described through longitudinal slots 13 located in the lower forward portion of the body of the horse. Located longitudinally of and suitably secured within the body of the horse is a box-like or main frame structure, generally indicated by the reference character 14. The main frame 14 comprises a horizontal bottom 15 which is preferably, though not necessarily, made of wood. The bottom 15 is provided with a forwardly pointed or tapered extension 15'. The opposite sides of the frame or bottom 15 is provided with opposite vertical side walls 16 which are preferably made of sheet iron and have their upper edges bent at right angles so as to form reinforcing flanges 17. The opposite ends of the main frame 14 are provided with transverse front and rear end walls 18 and 19. These walls 18 and 19 are preferably made of wood. The front end wall 18 is reinforced by sheet metal plate 20 and is provided with a lower flange 22. The lower edge of the wall 18 is further reinforced by a transverse angle member 23. The frame structure 14 is further reinforced by a horizontal top transverse plate 24 which has its opposite ends secured to the opposite walls. The bottom frame 15 is provided with two spaced apart longitudinally extending slots 25 through which extends two horizontally spaced apart levers 26 and 27. These levers 26 and 27 are pivoted on a transverse shaft 28 which is secured to the bottom 15. The upper ends of the levers 26 and 27 are provided with relatively large apertures 29 and 30 so as to loosely receive a transverse shaft or pin 31. The front end 32 of an expansion spring 33 is connected to the center of the transverse shaft 31 and the other end of the spring is connected to a pin 34 which, in turn, is secured to the bottom frame member 15. Additional springs 35 and 36 have their forward ends connected to the outer ends of the shaft 31 and their rearward ends connected to links 37. The links 37 have their rear ends secured to a transverse shaft 38 which, in turn, has its opposite ends secured to the outside vertical walls 16. Secured to the outer ends of the transverse shaft 38 are downwardly and rearwardly inclined supporting rear legs 39 which are adapted to extend through the hollow rear legs 11 of the horse. These rear legs 39 are rigidly secured to the frame or side walls 16 by rivets 40. The lower end of the legs 39 are pivotally connected, as shown at 41, to pivot brackets 42 which, in turn, are rigidly secured adjacent the rear portion of each of the rear rocker sections 43. The rear rocker sections are preferably in the form of arcuate square pipes and are adapted to receive in telescopic connection therewith front rocker sections of similar curvature, but of round cross section in the manner hereinafter described.

One of the essential features of the present invention is to provide a steering means which, under the control of the rider, permits the horse to turn to the right or the left in a relatively large arc so that the horse may be easily steered or turned during its to and fro movement. This mechanism includes a pivoted supplemental frame or steering section, generally indicated by the reference character 44 which comprises opposite side walls 45 and 46. The opposite side walls 45 and 46 are connected by transverse rear wall 47. Formed integrally with the rear wall 47 adjacent the upper and lower ends thereof are horizontally and rearwardly extending semicircular flanges 48 and 49. The upper flanges 48 are pivotally connected to a pin 50 which, in turn, is secured to the upper edge of the forward wall 18 of the main frame 14. The lower flange 49 is pivoted to a pin 51 in vertical alignment with the upper pin 50. The pin 51 is secured to the angle member 23 and the lower edge of the transverse front end wall 18 of the main frame 14. From the above description, it will be obvious that the supplemental frame 44 is pivoted to the main frame 14 and therefore has a limited oscillatable movement with respect thereto.

The front section 44 is oscillated or turned with respect to the main frame 14 by a transverse horizontal steering bar 52 which is located adjacent the front portion of the horse so as to be in easily accessible position to the rider on the horse. Secured to the center of this transverse handle bar 52 is a vertically and downwardly projecting shaft 53. The shaft 53 is journaled in a wooden block 54 which is located in the neck of the horse. The shaft 53 is retained in position by the usual washer and cotter, generally indicated by the reference character 55. Secured to the lower end of the shaft 53 is a horizontal and transverse bar 56. Secured adjacent the opposite ends of the transverse bar 56 are two forwardly projecting bolts 57 which extend through relatively large openings 58 on the opposite sides of the front wall 18 and reinforcing wall 20. The large headed ends of these bolts 57 are adapted to contact the rear transverse wall 47 for actuating the supplemental steering frame 44 about its pivot when the handle bar 52 is actuated. The supplemental steering frame section 44 has a forward transverse reinforcing plate 59 which has its opposite ends secured to the opposite side walls 45. Pivoted to the opposite side walls 45 through the medium of a transverse shaft 60 are downwardly extending slightly offset outwardly supporting front legs 61. The opposite front leg supports are secured together at a point below the pivot by a transverse rod 62 which extends through arcuate slots 63 located in opposite side walls 45 of the supplemental frame section 44. These arcuate slots are in transverse alignment and are concentrically arranged with respect to the pivots 60 of the front leg supports 61. The ends of the slots 63 form the stops for limiting the forward and rearward movement of the leg supports. Pivotally connected to the opposite leg supports 61 by a transverse shaft 64 are links 65. The opposite ends of the shaft 64 are rigidly secured to the leg supports 61 so as to rigidly support the same together. The connecting links 65 converge rearwardly and are pivotally connected at their rear ends to the forward ends of the opposite levers 26 and 27 by a transverse shaft 66. It will be noted that the relatively large apertures 29 and 30 in the upper ends of the levers 25 and 26, together with the loose pivotal connections of the links 65 with the shaft 66, furnish sufficient flexibility for turning the section 44 on its pivot. The lower ends of the front leg supports 61 are pivotally connected as shown at 67 to brackets 68 which, in turn, are secured to the front rocker sections 69. The front rocker sections 69 are round in cross section and are telescopically and slidably mounted in the front ends of the rear rocker sections 43. The front rocker sections consist of two pivoted segments, front segment 65' and intermediate segments 66' which have complementary adjoining apertured ears 67' and 68' respectively pivotally secured together by vertical pins 69'. The ear 68' is sufficiently rounded so as to permit free reciprocation of the front rocker sections 69' with respect to the rear rocker sections 43. Journaled in bifurcated portions of the rear ends of the front rocker sections 69 are rollers 70, which are journaled on suitable studs or shafts 71 so as to permit free movement of the front rocker sections with respect to the rear rocker sections. Mounted in bifurcated portions of the front ends of the rocker sections and journaled on transverse shafts 72 are rubber wheels or rollers 73. The shafts 72 are slidably and longitudinally mounted in opposite slotted openings 74 so as to permit the rollers to move rearwardly and frictionally engage the vertical walls 75 between the bifurcated portions at the front ends of the front rocker sections 69 and thereby act as brakes on the forward movement of the rollers 73. Obviously the rollers 73 will permit a slight forward movement in excess of the normal movement of the front and rear rocker sections when the rider properly balances his rocking action but if the forward movement exceeds certain limitations, the rollers will move rearwardly on the slots and brake against the forward edge 75 of the front rocker section.

Summarizing the advantages and functions of operation of my improved rocking or galloping horse, it will be obvious that the rear legs support 39 within the legs 11 are rigidly secured to the main frame within the body of the horse, while the front legs 12 and leg supports 61 are pivoted to the steering section or supplemental frame 44 so that on the forward movement of the rider on the horse, the body of the horse will move forwardly on the pivots of the front legs to the position shown in Fig. 3 and upon a rearward movement of the rider the springs 33, 35 and 36 will cause the forward legs and front rocker sections to move forwardly with respect to the rear rocker section to the position shown in Fig. 2. This movement will advance the horse forwardly step by step on each complete to and fro movement. If the rider is desirous to turn the horse to the left or the right, the steering handle 52 may be turned to actuate the supplemental frame section 44 about its pivot on the pin 51 and 50. When the supplemental frame section 44 is turned to the right or left it turns the legs 61 as a unit in the same direction, which, in turn, swings the front section segments 65' about their respective pivot pins 69' also in the same direction. At this first stage in the turning operation, the intermediate rocker segment 66' on the inside of the turn is telescoped slightly into its cooperating rear tubular rocking section 43 while the rocker segment 66' on the outside of the turn is slightly withdrawn from its cooperating tubular section 43. In other words, the turning of the handle bar swings the supplemental frame 44 and the front legs 61, rocker segments 65 as a unit about the pivot pins 69' of each of the rockers. In other words, the angular displacement of the front rocker segments 65' with respect to the adjacent segments is very slight on each rocker action of the horse so that the turn is made in gradual stages.

While in the above specification I have described one embodiment which my invention may assume in practice, it will, of course, be understood that the same is capable of modification and that modification may be made without departing from the spirit and scope of the invention as expressed in the following claims.

What I claim as my invention and desire to secure by Letters Patent is:

1. A galloping horse comprising a main frame mounted within the body of said horse, rear legs rigidly secured to said main frame, rear rocker sections pivotally connected to the lower ends of said rear legs, a supplemental frame pivoted on substantially a vertical axis to said main frame, front legs having their upper ends pivoted on a horizontal axis to said supplemental frame, front rocker sections including segments pivoted together, certain of said segments being pivoted to the lower ends of said front legs and telescopically engaging said rear rocker sections, a handle bar mounted on said main frame, a vertical shaft secured to and extending from said bar, and means for operatively connecting said shaft to said supplemental frame for steering said horse.

2. A galloping device comprising a simulated horse, rear legs rigidly secured to the body of said horse, front legs pivoted to the body of said horse, spring actuated means mounted in said horse for normally moving the front legs forwardly, front and rear rocker sections pivotally connected to said front and rear legs respectively, said front rocker sections comprising two segments pivoted together on a vertical axis, means for telescopically connecting the front and rear rocker sections together, and means operable from the rider's seat and operably related to said front legs and certain of said segments controlling the angular movement of certain of said segments with respect to the rear rocker sections for steering said device.

3. A galloping device comprising a simulated horse, rear legs rigidly secured ot the body of said horse, front legs pivoted to the body of said horse, spring actuated means mounted in said horse for normally moving the front legs forwardly, longitudinally extending curved front and rear rocker sections pivotally connected to said front and rear legs respectively, said front rocker sections comprising two segments pivoted together on the vertical axis, means for telescopically connecting the front and rear rocker sections together, means operable from the rider's seat and operably related to said front legs and certain of said segments for controlling the angular movement of certain of said segments with respect to the rear rocker sections for steering said device, and rubber rollers journaled on the forward ends of said front rocker sections.

4. A galloping device comprising a simulated horse, rear legs rigidly secured to the body of said horse, front legs pivoted to the body of said horse, spring actuated means mounted in said horse for normally moving the front legs forwardly, front and rear rocker sections pivotally connected to said front and rear legs respectively, means for telescopically connecting the front rocker sections with the adjacent rear rocker sections, means operable from the rider's seat and operably related to said front legs and front rocker sections for controlling the angular displacement of said front rocker sections with respect to the rear rocker sections for steering said device, and rubber rollers journaled and slidably mounted on the front ends of said front rocker sections.

5. A galloping device comprising a simulated horse, rear legs rigidly secured to the body of said horse, front legs pivoted to the body of said horse, spring actuated means mounted in said horse for normally moving the front legs forwardly, front and rear rocker sections pivotally connected to said front and rear legs respectively, said front rocker sections including segments pivotally connected together on a vertical axis, means for telescopically connecting the front sections with the cooperating rear rocker sections, steering means including a steering handle mounted on said horse and operative connections to said front legs and certain of said segments for controlling the relative movement of both front legs with respect to the body of said horse.

FRANK J. WEGLARZ.

REFERENCES CITED

The following references are of record in the file of this patent:

UNITED STATES PATENTS

| Number | Name | Date |
| --- | --- | --- |
| 937,109 | Spain | Oct. 19, 1909 |